United States Patent [19]

Johnson et al.

[11] Patent Number: 5,693,231

[45] Date of Patent: Dec. 2, 1997

[54] AROMATIC/ALIPHATIC NYLON POLYMER MICROPOROUS MEMBRANES

[75] Inventors: James S. Johnson, Acton; Michael J. Witham, Westborough; Edward T. Carter, Worcester, all of Mass.

[73] Assignee: Micron Separations, Inc., Westborough, Mass.

[21] Appl. No.: 436,631

[22] Filed: May 8, 1995

[51] Int. Cl.⁶ .................. B01D 61/00; B01D 39/00
[52] U.S. Cl. .................. 210/651; 210/490; 210/500.38; 264/41; 264/49
[58] Field of Search .................. 210/500.38, 490, 210/500.23, 651, 640, 500.35; 264/41, 49

[56] References Cited

U.S. PATENT DOCUMENTS 4,340,480  7/1982  Pall et al. .................. 210/490
5,385,672  1/1995  Peterson et al. .................. 210/637
5,547,575  8/1996  Demmer et al. .................. 210/490

*Primary Examiner*—Ana Fortuna
*Attorney, Agent, or Firm*—Bruce F. Jacobs

[57] ABSTRACT

Polyamide (nylon) microporous membranes are prepared from a polyamide (nylon) polymer which contains aromatic rings, aliphatic carbon chains, and amide groups. The membranes exhibit improved long term performance characteristics. The membranes are preferably prepared from a polyamide polymer having the structure:

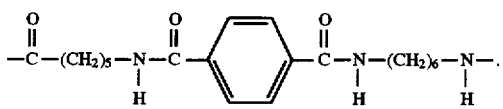

41 Claims, No Drawings

5,693,231

AROMATIC/ALIPHATIC NYLON POLYMER MICROPOROUS MEMBRANES

FIELD OF THE INVENTION

The present invention is directed to polyamide (nylon) microporous membranes. The membranes are prepared from a polyamide (nylon) copolymer resin which contains both aromatic and aliphatic groups. The membranes are alcohol-insoluble and generally hydrophilic as formed, although some may be hydrophobic depending upon the specific resin and preparative process. The membranes are microporous sheets having an absolute particle removal capability in the range of about 0.04 micrometer and larger. The term "alcohol-insoluble" is used herein to refer to materials which are not soluble in lower aliphatic alcohols such as methanol and ethanol at room temperature.

BACKGROUND OF THE INVENTION

The prior art is replete with nylon membranes prepared from aliphatic polyamide polymers. For example, Lovell et al (U.S. Pat. No. 2,783,894) discloses alcohol-soluble aliphatic polyamide membrane sheets. The membranes are prepared by forming an alcohol-water solution containing the aliphatic nylon, adjusting it to the point of incipient precipitation by the addition of a solvent miscible non-solvent which decreases the solubility of the nylon, casting the solution on an optically smooth surface of a solid base, and converting to a solid film by exposure to an atmosphere containing a constantly maintained concentration of exchangeable non-solvent vapors, i.e. vapors of a liquid in which the nylon is not soluble but which are exchangeable with vapors of the solvent for the polyamide. The resultant membranes are soluble in alcohol, as well as in a considerable number of other solvents, and may not be steam sterilized. This limits the scope of their usefulness. In the present invention, the mixed aromatic and aliphatic polyamide polymer and the membrane prepared therefrom are both alcohol-insoluble.

Hiratsuka et al. (U.S. Pat. No. 3,746,668) also prepares membranes from an alcohol solution of alcohol-soluble aliphatic polyamides, gelling the solution by addition of a cyclic ether gelling agent, and drying the film. Alcohol-soluble relatively low molecular weight random copolymers of three aliphatic polyamides, i.e. nylon 6 (poly-ε-caprolactam), nylon 66 (polyhexamethylene adipamide), and nylon 610 (polyhexamethylene sebacamide), are taught.

Marinaccio et al. (U.S. Pat. No. 3,876,738) describes a process for producing microporous membrane sheets from both alcohol-soluble and alcohol-insoluble aliphatic polyamide resins (nylon 6 and 6–10 in the examples) which are preferably cast beneath the surface of a precipitation bath without air contact. The process of the present invention is not sensitive to air exposure and accomplishes the preparation of membranes from mixed aromatic/aliphatic polyamide polymers.

Pall (U.S. Pat. No. 4,340,479) discloses alcohol-insoluble hydrophilic polyamide resin membrane sheets. According to the patent, such membranes can only be prepared from alcohol-insoluble polyamide resins having a ratio of methylene to amides $CH_2$:NHCO within the range of from about 5:1 to about 7:1. A second Pall patent (U.S. Pat. No. 4,340,480) discloses alcohol-insoluble hydrophobic liquiphilic polyamide resin membrane sheets which, according to the patent can only be prepared from alcohol-insoluble polyamide resins having a ratio of $CH_2$:NHCO greater than about 7:1. Both Pall patents disclose the formation of membranes from only aliphatic polyamide resins. In addition, the Pall patents require that nucleation occur (as demonstrated by the generation of a visible precipitate) during the manufacturing process by first forming a starting resin solution and then adding a solvent miscible non-solvent to bring the starting solution to the point of incipient precipitation to form a casting polymer solution from which the membranes are then cast. In the process of the present invention, no visible precipitate need be formed and the process is independent of both mixer type and vessel geometry.

Knight (U.S. Pat. No. 5,084,179) and Johnson (U.S. Pat. No. 5,215,662) each claim a membrane made of another aliphatic nylon, nylon 46. These patents are specific to nylon 46, the membranes that result from this polymer, and the processes by which the membranes are made.

Johnson (U.S. Pat. No. 5,411,663) discloses a microporous membrane made from still another aliphatic polyamide polymer, i.e. an alcohol-soluble Type 8 nylon in which the hydrogen atoms of a portion of the amide nitrogen atoms are replaced by alkoxyalkyl and alkoxyl groups. Nevertheless, the polyamide polymer is fully aliphatic. As a result of the manufacturing process, the alcohol soluble Type 8 nylon polymer is converted into an alcohol-insoluble microporous membrane.

The chemical distinctions between fully aliphatic polyamide resins such as nylon 66 and the fully aromatic nylons, such as Kevlar® of DuPont, are well-known. Also art-recognized has been the differences in properties of aliphatic polymers from aromatic polymers, especially in the field of microporous membranes. Aromatic polymers have generally been known to produce hydrophobic microporous membranes. Polysulfone membranes, such as those of Kraus (U.S. Pat. No. 4,964,990), polycarbonate membranes made by the so-called track-etch process and even cellulosic polymers are examples of aromatic polymers that produce naturally hydrophobic membranes. When it is desired to use these membranes in hydrophilic applications, they require a hydrophilization treatment.

Some of the polyamide membranes of the present invention, despite the presence of the aromatic groups, have been made which are naturally hydrophilic without a further treatment, e.g. in the absence of admixtures with other polymers or the addition of wetting agents or by post-formation treatments. A preferred embodiment of the present invention is a hydrophilic (spontaneously wettable) membrane because of the many aqueous-based membrane applications.

The terms "hydrophilic" and "hydrophobic" are normally relative terms referring to the water-wetting capacity of a membrane. For the purposes of this invention, however, a membrane is hydrophilic only if it wets by water spontaneously within about 10 seconds in the absence of an externally applied pressure which would force the water into the pores. All non-hydrophilic membranes are hydrophobic.

The hydrophilicity of a membrane may be determined by floating a piece of membrane on a water surface and observing the effect of the water thereon, particularly changes in color, shade, or opacity. If a membrane is hydrophillic it will substantially wet through spontaneously within about 10 seconds. Also commonly it will cease floating within 1 to 2 minutes.

Hydrophilic microporous membranes are in certain cases readily useful in the separation of components present in an aqueous solution generally without requiring the addition of a surface active agent (surfactant) to the membrane. Hydrophobic membranes per se have numerous commercial uses, particularly as vent filters. Moreover, the surfaces of hydrophobic membranes may be modified so as to be hydrophilic by a number of conventional techniques, e.g. by the addition of surface active agents for use in situations where this will not affect the filtration medium, by placing a hydrophilic coating atop the membrane, by plasma treatment with and without additional chemicals, and the like.

Accordingly, it is an object of the present invention to produce an alcohol-insoluble microporous polyamide membrane containing a mixture of aromatic and aliphatic groups which membrane possesses exceptional stability under severe conditions of temperature and pH.

While membranes of the invention are generally naturally hydrophilic as defined above, under certain process conditions a membrane may be made which will only be fully wetted out after extensive equilibration with water or under intrusion with water under pressure or after further treatment such as the addition of wetting agents. Since a majority of filtration and transfer applications involve aqueous solutions, the preferred embodiment of this invention is the naturally hydrophilic form of the membrane.

Another object is to produce such membranes from polyamide polymers containing both aliphatic and aromatic groups.

It is a further object of the present invention to produce such membranes by a relatively non-complex and non-polluting manufacturing process.

Yet another object is to provide a nylon microporous membrane capable of differential, selective filtration of microporous organic substances such as proteins and DNA due to the unique binding properties of the membrane.

DISCLOSURE OF THE INVENTION

Accordingly, the present invention is directed to alcohol-insoluble polyamide (nylon) membranes which have both aliphatic and aromatic groups between the polyamide groups therein. The polyamide membranes of the present invention are prepared from polyamide resins which contain aromatic, aliphatic, and amide groups therebetween. Although the aromatic groups are preferably unsubstituted benzene rings, other aromatic groups, including those containing one or more substituents may be useful to modify the performance characteristics of a final membrane for specific applications. The aliphatic groups are generally simple unsubstitued straight chains of methylene groups, but they may be substituted or branched. The polymers are prepared by reaction of an aromatic diacid with an aliphatic diamine or an aromatic diamine with an aliphatic diacid. In either case optionally further in the presence of a compound containing a reactive amino group and a reactive carboxylic acid, such as an aliphatic lactam or amine-acid or an aromatic amine-acid.

This invention is also directed to methods of manufacturing the microporous membranes and the use of the membranes in separation and hybridization applications.

DESCRIPTION OF THE PREFERRED EMBODIMENTS

The mixed aromatic and aliphatic polyamide (nylon) membranes of the present invention are prepared from polyamide resins which contain aromatic groups, aliphatic groups, and amide groups therebetween. The aromatic groups are preferably unsubstituted benzene rings. However, they may be multiple ring structures (such as those derived from naphthalene) or hetero rings containing a nitrogen or oxygen atom as part thereof or they may contain one or more substitutents which can be designed to meet specific requirements. Suitable such substituents include but are not limited to: hydroxyl, alkyl ($C_{1-12}$), amine, aldehyde, nitrate, carboxyl, and halogen. The aliphatic groups will generally contain from about 3 to 15, preferably about 4 to 10, and most preferably about 4 to 8 carbon atoms. The polymers may be prepared by reaction of either an aromatic diacid with an aliphatic diamine or an aromatic diamine with an aliphatic diacid to form amide linkages in a conventional and well-known manner. Suitable aliphatic diacids include oxalic, malonic, succinic, glutaric, adipic, pimelic, subaric, azelaic, sebacic, and 2-chloro-butanedioic acids and the like. Suitable aliphatic diamines include α,ω-diaminopropane, α,ω-diaminobutane, α,ω-diaminopentane, α,ω-diaminohexane, α,ω-diaminoheptane, α,ω-diaminooctane, and the like. Suitable aromatic diacids include 1,2-phthalic acid, 1,3-phthalic acid, 1,4-phthalic acid, 1,2-carboxyl-3-nitrophthalic acid, 2,6-naphthalenedicarboxylic acid, di-(4-carboxyphenyl)ether, and the like. Suitable aromatic diamines include 4,4'-methylenedianiline, 4,4'diaminodiphenylether, 4,4'-diaminodiphenylsulfone, 4,4'-diaminobenzaniline, 1,5-diaminonaphthalene, and the like. Substantially equimolar amounts of the diacid and diamine are generally reacted to form the polymer. In addition, the reaction mixture may further include one or more aliphatic or aromatic compounds having both a reactive carboxyl group and a reactive amine, i.e. an amine-acid, or which will form same upon ring opening. Suitable such aliphatic amine-acids are the lactams, examples of which include: ε-propriolactam, ε-butyrolactam, ε-caprolactam, 2-pyrrolidinone, 2,5-diketopiperazine, and the like, as well as non-lactams such as 2-amino-4-hexenoic acid. Suitable such aromatic amine-acids include such as 3-aminobenzoic acid, 4-aminobenzoic acid, 4-aminophenylacetic acid, and the like.

The amount of amine-acid to be used will depend upon the desired physical and chemical properties of the final membrane and the ease of manufacturing the polyamide polymers and membranes. As such, any amount may be used. When used, an amine-acid will commonly be used in an amount of about 10 to about 1,000 mole %, preferably about 50 to about 200 mole %, more preferably about 80 to about 125 mole %, of the diacid or diamine.

One specific family of preferred polyamide resins for use in the present invention are formed by a condensation reaction of an aromatic diacid, an aliphatic diamine, and an aliphatic lactam. A particularly suitable commercially available polyamide resin is referred to as "nylon 6/6T" and is manufactured by BASF Corporation and described in a technical bulletin entitled "Ultramid T", a trade name for nylon 6/6T. This bulletin is available from BASF Corporation, Plastics Materials, 1419 Biddle Avenue, Wyandotte, Mich. 48912. Nylon 6/6T is essentially an equimolar copolymer of ε-caprolactam, hexamethylenediamine, and phthalic acid. The polymer is believed to have the 123123123 repeating structure shown below, but this has not been conclusively established by the manufacturer.

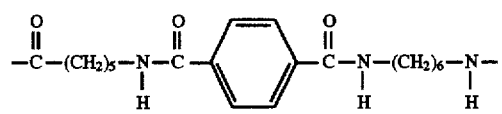

Ultramid T products KR 4350, KR 4351, and KR4352 are preferred. The "KR" refers to the grade of the polymer and the number refers to the relative molecular weight, the higher number being the higher molecular weight.

A second preferred class of mixed aromatic and aliphatic polyamide polymers are the polyphthalamides manufactured by and available from Amoco Company under the tradename Amodel. Additional suitable compounds include polyamide-imides.

While generally not required, the polymers may be alkoxyalkylated by reaction with an aldehyde, such as formaldehyde, and an alcohol, such as methanol, as is conventionally done to prepare Type 8 nylon polymers as disclosed in such as U.S. Pat. No. 2,430,860 (Cairns). Alkoxyalkylation can modify the alcohol solubility of the polymer, i.e. making the polymer alcohol soluble, when a sufficient amount of alkoxyalkyl groups are present. Thereafter the polymers can be converted into alcohol-insoluble membranes in accordance with the procedures of U.S. Pat. No. 5,411,663.

The polyamide resins useful in the present invention may have any ratio of $CH_2$ methylene groups to NHCO amide groups. Generally, however, the ratio is in the range of from about 2 to less than about 5, more preferably from about 2 to less than 4, and most preferably from about 2.5 to less than about 3.75.

To prepare the alcohol-insoluble microporous membranes of this invention, a suitable solvent/nonsolvent system must be identified for the particular polyamide polymer. The mixed aromatic/aliphatic polyamide copolymers are often quite difficult to dissolve. Generally suitable solvents will include, but are not limited to, strong acids such as hydrochloric acid, formic acid, sulfuric acid and mixtures thereof, in the presence of non-solvents such as water or a weak acid such as acetic acid, citric acid, propionic acid, phosphoric acid, and mixtures thereof.

To prepare a solution of the aromatic/aliphatic polyamide polymer suitable for microporous membrane formation, it has been found that concentrated hydrochloric acid, 98% formic acid at elevated temperature (about 70° C.), or a combination of formic and hydrochloric acids are preferred. The preferred solvent system for use with the polymers is a combination of 98% formic acid and reagent grade (37%) hydrochloric acid. It has also been found that different solvent systems are better used to produce different pore size membranes. Accordingly, the more preferred solvent system is a mixture of 98% formic acid and reagent grade hydrochloric acid in the range of about 2:1 to 6:1 parts by weight to produce microporous membranes having a particle removal rating of about 0.04 to about 1.2 micrometers. For larger pore membranes, i.e. >about 1.2 micrometer pore size, reagent grade hydrochloric acid may be used in the absence of the formic acid.

Suitable nonsolvents are chosen based upon compatability with the polymer and the solvents which when mixed with the polymer and solvents result in the desired pore size of the microporous membranes. Suitable nonsolvents are generally polar liquids which include, but are not limited to, water; alcohols such as methanol, ethanol, and propanol; weak acids such as citric acid; aqueous salt solutions; and mixtures thereof. Preferably the non-solvent is a mixture of water and citric acid. Because greater proportions of polymer in the mix produce smaller pores in the resulting membrane, a range of pore sizes from about 0.04 to about 20 micrometer can be produced when about 10 to about 25 wt. % polyamide polymer is added to a mix of about 15 to 90 wt. % solvent, and about 0 to 75 wt. % nonsolvent.

For ease of dissolution the aromatic/aliphatic polyamide polymer is added into a suitable mixture of solvents and optional nonsolvents, generally at a temperature in the range of about 20° to 100° C., preferably about 35° to 80° C., at a speed sufficient to prevent the polymer from clumping but insufficient to cause overheating. Within the range, higher temperatures cause dissolution to proceed more rapidly so that the mix time to total dissolution can be decreased. A variety of mixing devices for blending solids with liquids to form viscous fluids are known in the art. The mix times to dissolve the polymer generally range up to about 18 hours, depending on the physical state of the polymer; a finely powdered polymer will dissolve more quickly than an extruded pelletized polymer. In the admixture, the solids content will commonly range from about 10 to 25% by weight of polymer, preferably 10 to 20%. After dissolution is completed, the mix is generally filtered to remove any extraneous particles which might cause a problem in casting of the resulting lacquer or produce occlusions in the resulting membrane. Any air bubbles created in the mixing step should be eliminated, preferably by allowing the solution to stand undisturbed prior to casting into a membrane.

Generally, the membranes are formed by casting the polyamide polymer solution into a uniform film, preferably upon a non-woven cloth material by drawing the cloth web through a conventional knife box or other coating mechanism which controls the thickness of the coating. Preferably, the cloth webs are prepared from polyester, polypropylene, or polyethylene. The composite, with the support web generally centered in the film of polymer solution, is then passed into a precipitation bath comprised of solvents and nonsolvents for the polymer such that a microporous alcohol-insoluble polymer is precipitated in a uniform, consistent manner. While the precipitation bath may contain solvents for the nylon polymer, they must not be present at concentrations high enough to prevent precipitation of the polymer. A preferred precipitation bath contains from 0 to about 85% formic acid in water. The solvent content of the bath should be monitored to maintain a substantially constant bath specific gravity since a range of different pore size membranes can be produced from a single batch of casting solution by varying the composition of the precipitation bath. Most commonly, the precipitation bath contains a combination of solvents and nonsolvents for the aromatic/aliphatic polyamide. Thereafter, the resulting membrane is rinsed free of any residual solvents and dried using techniques ordinary in the art.

As noted, control of the relative proportions of the mixed aromatic/aliphatic polyamide polymer and the solvents and nonsolvents in the polymer solution and precipitating bath can be used to modify the pore size, density, and hydrophilicity of the resulting material. Since a higher solution temperature can result in somewhat larger pore sizes, control of the temperature of the dissolved polymer solution during a casting run can be used to manipulate the pore size of the resulting membrane. Accordingly, the casting system will desirably include a means of temperature control, preferably a heat exchanger. As the temperature of the casting solution increases so does the pore size of the resulting membrane, all other variables being constant. This feature allows production flexibility since a range of pore size membranes can be produced from a single batch of polymer solution.

The alcohol-insoluble microporous polyamide membranes may have a bimodal pore structure with large interconnected chambers that rarely appear at the surface of the membrane in combination with smaller openings that appear at the surface when viewed by a scanning electron microscope. To produce polyamide copolymer membranes which are skinless, i.e. in which there is essentially no bimodal pore structure and the pores which extend through the membrane from one surface to the other are either substantially uniform in size or slightly tapered from one surface to the other, the polymer solution may be modified to be essentially at the precipitation point for the specific polymer while also modifying the precipitation bath so that it is close to being a solvent for the polymer.

Various pore structures may be created by using multiple polymer solutions and modified support cloth coating techniques. For example the support cloth may be saturated with a polymer solution which gives larger or smaller pore sizes than those generated in the overcoated, external layer of polymer solution. It is also possible to generate membrane structures of differing pore sizes on opposing surfaces of the membrane by overcoating on only one side of the solution-saturated support cloth with a polymer solution and immersion bath compositions and secondarily solution and bath temperatures to control the membrane pore structure.

The membranes may have any desired thickness as is conventional in the microporous membrane art. Generally the membranes are about 50 to 200 micrometers thick.

The alcohol-insoluble polyamide microporous membranes exhibit a superior heat resistance as compared to equivalent purely aliphatic or aromatic membranes of the polyamide resins from which the polyamide polymers are prepared. For instance, after heating for 15 minutes at 280° C. in nitrogen, a nylon 66 membrane is destroyed while the corresponding nylon 6/6T membrane appeared unaffected. The preferred membranes of this invention can withstand higher temperatures during use than nylon 66 membranes.

The resulting alcohol-insoluble, microporous polyamide resin membranes have a different chemical structure than both previous alcohol-insoluble and alcohol-soluble microporous polyamide membranes. The resulting membranes have been found to exhibit superior performance to commercial samples of standard nylon 46 membranes. The addition of the aromatic groups to the aliphatic groups present in current commercially available polyamide microporous membranes substantially changes the properties of the resulting membrane and produces a unique product having superior properties, especially for use in filtering high or low pH solutions where repeated steam sterilization or hot water sanitization is commonly used, and in high temperature filtration applications.

The microporous membranes made from the nylon6/6T aromatic/aliphatic nylon of this invention have low water absorbtion (about 75% that of aliphatic nylon 66, 50% that of aliphatic nylon 46); have low DNA binding but high protein binding relative to commercial nylon membranes; have enhanced hydrolytic stability compared to aliphatic nylon 66 or 46; are more easily pleated without damage or loss of integrity; have a melting point of 295° C., higher then both nylon 66 and nylon 46; can be radiation sterilized; can be produced to have a range of hydrophilic to hydrophobic characteristics by increasing polymer solids in the casting dope composition, by decreasing the acidity of the immersion bath composition, by decreasing the casting rate, and by increasing the molecular weight of the polymer; can be modified to enhance either the hydrophilic or hydrophobic nature of the membrane by polymer grafting, polymer coating, adding functional groups by chemical means, plasma surface treatments, or addition of conventional wetting agents or hydrophobic coatings such as a silicone oil; can be modified to enhance DNA binding in plaque lifts and Southern blotting by addition of polar groups, positive charges, or other coatings having increased DNA affinity. The membranes containing aromatic groups, aliphatic groups, and amide linkages therebetween may have a skin (including a partial skin) or they may be skinless.

In the following non-limiting examples, unless otherwise specified, all parts and percents are by weight; formic acid is 98% formic acid; reagent grade hydrochloric acid is 37% hydrochloric acid; citric acid powder is dry citric acid powder; and citric acid solution is 63 wt % citric acid in water. In the examples, the pore sizes are determined by bubble point (psi) and the flow rates are given in milliliters of water flowing per square centimeter per minute per psig of applied vacuum (ml/cm$^2$/min/psig).

EXAMPLE 1

A casting dope (polymer solution) was made by mixing 15% reagent grade hydrochloric acid, 15% citric acid powder, 15% of a nylon 6/6T copolymer of equimolar amounts of ε-caprolactam, hexamethylenediamine, and phthalic acid (KR4352-BASF Corporation), and 55% formic acid (98% solution). All ingredients, except for the nylon, were combined before addition of the copolymer. The nylon copolymer was dissolved by mixing with a standard laboratory mixer for 16 hours while being maintained at 50° C. by a water bath. Once the polymer was fully dissolved, the solution was screened through a fine non-woven polyester cloth to remove any coarse foreign particles and allowed to degas overnight. A clear, homogenous polymer solution was formed.

The casting dope was coated or cast onto a non-woven polyester support cloth at a rate of about 1.5 to 5 ft/min and then the coated cloth was immersed in a precipitation (gelation) bath consisting of 75% formic acid in water. After five minutes the membrane was removed from the bath, washed with water for 30 minutes, and air dried in a laboratory convection oven at 65° C. for one-half hour.

A second casting of an unsupported film, i.e. in the absence of the support cloth was also made by spreading a thin film of the polymer solution onto a glass plate and immersing the coated plate into the precipitating bath. After equilibration with the precipitating bath, the film membrane was removed from the glass plate, washed with water, and dried as above prior to testing.

The supported membrane thus produced was about 120 micrometers thick, hydrophobic, had a water bubble point of 37 psig (indicating a pore size of about 0.4 micrometers), and had a water flow rate of 14.2 cc/cm$^2$/min/psig. The unsupported membrane was 165 micrometers thick, hydrophobic, had a water bubble point of 27 psig (indicating a pore size of about 0.5 micrometers), and had a water flow rate of 28.8 cc/cm$^2$/min/psig. Neither membrane spontaneously wetted out within 10 sec.

EXAMPLE 2

The procedure of Example 1 was repeated except that the casting dope solution contained 15% hydrochloric acid, 15% citric acid powder, 15% nylon 6/6T (KR 4352), and 50% formic acid. All other ingredients were combined before adding the polymer. The finished, screened solution was clear and homogenous as in Example 1. When coated onto a support cloth and immersed into a 50% formic acid precipitation bath to form a membrane as in Example 1, the membrane was hydrophobic (wetting out after 20–30 sec.), was 115 micrometers thick, had a water bubble point of 34 psi (pore size 0.4 micrometer), and a pure water flow rate of 18.6 cc/cm$^2$/min/psig.

EXAMPLE 3

In this example, the effect of bath composition was examined using unsupported membranes produced using the casting dopes of Examples 1 and 2. Each of the membranes was hydrophobic taking 20–30 secods to spontaneously wet out. The results are shown in Table A in which "psi" is the bubble point, "rate" is the flow rate in cc/cm$^2$/min/psig, and "micron" is the membrane thickness in micrometers.

TABLE A

| Precip. Bath | Example 1 | | | Example 2 | | |
|---|---|---|---|---|---|---|
| Composition | psi | rate | micron | psi | rate | micron |
| 70% HCOOH | 38 | 9.4 | 150 | 47 | 20.5 | 155 |
| 75% | 27 | 28.6 | 155 | 48 | 27.1 | 160 |
| 80% | 24 | 43.2 | 150 | 34 | 10.9 | 165 |

EXAMPLE 4

In this example, the procedure of Example 1 was repeated except that the casting dope composition was 62% formic acid, 15% reagent grade hydrochloric acid, 8% citric acid solution and 15% nylon 6/6T (KR4351). The mixture was dissolved by stirring at 50° C. for 18 hours. The precipitation bath used was formic acid in water at a 1.15 specific gravity (equivalent to about 75% formic acid). The casting dope was coated onto a polyester web and formed into a membrane which was hydrophilic (wetting out within 5 sec.), 110 micrometers thick, had a water bubble point of 85 psig (pore size about 0.1 micrometers) and a flow rate of 5.3 cc/cm$^2$/min/psig.

EXAMPLE 5

In this example, a membrane supported by a polyester web was prepared as in Example 1, but using a casting dope of 65% formic acid, 15% reagent grade hydrochloric acid, 6% citric acid solution and 14% nylon 6/6T (KR 4351). The mixing conditions were 35°–40° C. for 16 hours. The precipitating bath composition was 1.15 specific gravity formic acid in water. The microporous polyamide membrane thus prepared was hydrophobic (wetting out in about 40 sec.), 110 to 115 micrometers thick, had a water bubble point of 55 psig (pore size about 0.2 micrometer), and a water flow rate of 9.41 cc/cm$^2$/min/psig.

EXAMPLE 6

The procedure of Example 1 was repeated using a casting dope composition of 64% formic acid, 15% reagent grade hydrochloric acid, 6% citric acid solution and 15% nylon 6/6T polymer (KR4351). The dissolution occurred at 41° C. over 17 hours. The microporous polyamide membrane was formed by coating the polymer solution onto a polyester web and passing it into a precipitation bath of 1.15 specific gravity formic acid in water. The membrane was hydrophilic (wetting out spontaneously in 2–5 sec.), 110 to 120 micrometers thick, had a water bubble point of 37 psig (pore size about 0.4 micrometers), and a water flow rate 22.9 cc/cm$^2$/min/psig.

EXAMPLE 7

A further membrane sample was prepared using the procedure of Example 1 with a casting dope of 67% formic acid, 15% reagent grade hydrochloric acid, 4% citric acid solution, and 14% nylon 6/6T polymer (KR4351), with mixing at 40° C. for 16 hours. A microporous polyamide membrane was formed by coating the polymer solution onto a polyester web and passing it into a precipitation bath of 1.16 specific gravity formic acid in water. The microporous membrane was hydrophilic (wetting out spontaneously in 2–5 sec.), 110 to 120 micrometers thick, had a bubble point of 22 psig (0.8 micrometers pore size), and a water flow rate of 5.71 cc/cm$^2$/min/psig.

EXAMPLE 8

In this example, prepared according to the process of Example 1, the casting composition contained 81% reagent grade hydrochloric acid, 5% citric acid solution and 14% nylon 6/6T polymer (KR 4351). The dissolution process was conducted at 35° C. for 16 hours. The polymer solution was coated onto a polyester web and passed into a precipitation bath of 75% formic acid in water. The microporous membrane was hydrophilic (wetting out spontaneously in 2–5 sec.), 110 to 115 micrometers thick, had a bubble point of 14 psig (pore size about 5.0 micrometers), and a water flow rate of 166 cc/cm$^2$/min/psig.

EXAMPLE 9

The present example was conducted to determine the effects of air exposure of the casting dope prior to immersion in the casting bath. The casting dope was formed as in Example 1 using a composition of 64% formic acid, 14% reagent grade hydrochloric acid, 6% citric acid powder, and 15% nylon 6/6T polymer (KR4351), and was mixed for 18 hours at 40° C. The precipitation bath was 1.15 specific gravity formic acid in water. Film casts onto glass plates were exposed to air for less than 2 seconds and for 5, 10, or 30 seconds prior to immersion in the precipitation bath. The test results given in Table B showed little difference in the membranes produced due to air exposure. All were hydrophilic, spontaneously wetting out in about 5–8 seconds.

TABLE B

| Exposure Time Seconds | Bubble Point psi | Flow Rate cc/cm$^2$/min/psig | Thickness Micrometers |
|---|---|---|---|
| <2 | 33 | 14.5 | 155 |
| 5 | 35 | 14.2 | 160 |
| 10 | 32 | 12.2 | 160 |
| 30 | 35 | 12.9 | 150 |

EXAMPLE 10

The procedure of Example 1 was repeated with 5 gallon batches of casting solutions while varying numerous aspects of the process, including: the polymer solids from 14 to 15%; the mixing temperature from 25° to 50° C.; the mixing time from 4 to 6 hours; the solvent composition from 62 to 67% formic acid and from 4 to 8% citric acid solution while maintaining the hydrochloric acid content at 15%; and the precipitation bath composition from 1.113 to 1.136 specific gravity. In each case the membranes were cast on a polyester web. The specific compositions, mixing conditions, and casting conditions used, and characteristics of the resulting membrane are given below in Table C.

TABLE C

| | A | B | C | D |
|---|---|---|---|---|
| Composition, wt % | | | | |
| Polymer (KR 4351) | 14 | 15 | 14 | 15 |
| HCl (Reagent) | 15 | 15 | 15 | 15 |

TABLE C-continued

|  | A | B | C | D |
|---|---|---|---|---|
| Formic Acid (98%) | 67 | 64 | 64 | 62 |
| Citric Acid (63%) | 4 | 6 | 7 | 8 |
| Mixing Conditions |  |  |  |  |
| Time, hr | 5 | 4.5 | 4.3 | 5.67 |
| Temperature, °C. | 40 | 24–40 | 25 | 48–50 |
| Precipitation Bath |  |  |  |  |
| Specific gravity | 1.113 | 1.114 | 1.130 | 1.136 |
| % Formic acid (approx.) | 50 | 50 | 65 | 66 |
| Membrane characteristic |  |  |  |  |
| Pore size, μm | 1.2 | 0.4 | 0.2 | 0.1 |
| Thickness, μm | 85–90 | 90–95 | 95 | 90 |
| Bubble Point, psig | 18–22 | 37–42 | 57–58 | 80–86 |
| Wetout Time, sec | 4 | <1 | <1 | <1 |
| Flow Rate, cc/sq cm/min/psig | 80–100 | 221–25 | 9.8–10.1 | 4.8–5.3 |

Further testing was conducted to determine the additional characteristics of the microporous membranes of the present invention, the results of which are shown in the following examples.

EXAMPLE 11

In this example, the water throughput of the nylon 6/6T membranes was compared to commercial nylon 46 membranes of Micron Separations, Inc. using city tap water. The test results show the throughput of nylon 6/6T membranes to be equivalent to or better than comparable pore size nylon 46 membranes. A nylon 46 membrane (47 mm disk) having a pore size of 0.4 micrometers filtered 250 milliliters of tap water under a pressure differential of 10 psig before clogging to one tenth of the original flow rate. A nylon 6/6T membrane having a pore size of 0.4 micrometer filtered 250 to 400 ml of tap water before clogging to one tenth of the original flow rate.

EXAMPLE 12

In this example the protein binding capability of nylon 6/6T membranes was compared to a number of other nylon membranes. Using bovine serum albumin, these tests indicated that the nylon 6/6T copolymer membranes have about 70% higher protein binding than do commercial nylon 46 membranes and about the same protein binding as do commercial membranes made from Type 8 nylon. They have substantially higher protein binding than do aromatic membranes of cellulose acetate or polysulfone, which are known to be low protein binding membranes.

EXAMPLE 13

The present example compares DNA binding capacity of nylon 6/6T membranes as compared to purely aliphatic nylon membranes. Side by side tests in Plaque Lift and Southern Blot applications showed significantly lower DNA binding than aliphatic nylon membranes. The nylon 6/6T membrane can be surface modified to enhance the DNA binding to commercially competitive levels. Side by side Southern Blot testing has shown nylon 6/6T membranes to have about 25–50% of the signal strength of nylon 46 and about 10–20% of the signal strength of commercially available charged nylon 66 membranes.

The combination of the high protein binding as shown in Example 12 and low DNA binding shown in Example 13 indicate that the membranes of this invention should be exceptionally effective in the field of DNA purification by selective protein removal.

EXAMPLE 14

In this example, prepared according to the procedure of Example 1, the diamine and diacid are polymerized in the absence of a caprolactam. The membranes were all cast on a polyester nonwoven cloth and precipitated in a formic acid/water immersion bath. The polymer used was Amodel A1000 unfilled polyphthalamide as supplied by Amoco Corporation. The specific casting dope compositions, immersion bath specific gravities, bubble points, flow rates and thicknesses obtained are provided in Table D. The formic acid (HCOOH) refers to 98% formic acid and HCl refers to reagent grade hydrochloric acid. The membranes were all hydrophobic, spontaneously wetting out in more than 10 seconds.

TABLE D

| Sample | Casting Dope Composition, wt % | | | Imm. Bath Sp. gr. | Bubble Point (psig) | Flow Rate cc/cm²/- min/psig | Thickness (μm) |
|---|---|---|---|---|---|---|---|
|  | Polymer | HCOOH | HCl |  |  |  |  |
| A | 15 | 60 | 25 | 1.154 | 32 | 2.16 | 120 |
| B | 15 | 40 | 45 | 1.154 | 24 | 4.85 | 110 |
| C | 16.5 | 65.5 | 18 | 1.120 | 65 | 0.71 | — |
| D | 16.5 | 70.5 | 13 | 1.140 | 88 | .3 | — |
| E | 15 | 65 | 20 | 1.155 | 50 | 1.23 | — |

The foregoing description, specific embodiments, and examples are given for purposes of illustrating the invention. It will be understood that the invention is not intended to be limited thereto, and that numerous variations and combinations of the invention can be utilized limited only by the scope of the appended claims.

What is claimed is:

1. An alcohol-insoluble polyamide microporous membrane comprising a polyamide copolymer having aliphatic, aromatic, and amide groups, wherein the copolymer has a methylene:amide ratio in the range of from about 2:1 to less than about 5:1, said membrane having an absolute particle removal capability greater than 0.04 micrometers.

2. The microporous membrane of claim 1 wherein the aromatic groups are unsubstituted benzene rings.

3. The microporous membrane of claim 1 wherein the aromatic groups contain at least one substituent selected from the group consisting of hydroxyl, alkyl ($C_{1-12}$), amine, aldehyde, nitrate, carboxyl, and halogen.

4. The microporous membrane of claim 1 wherein the aliphatic groups contain about 3 to 15 carbon atoms.

5. The microporous membrane of claim 1 wherein the aliphatic groups contain about 4 to 7 carbon atoms.

6. The microporous membrane of claim 1 wherein the polyamide copolymer is prepared by reaction of an aromatic dicarboxylic acid and an aliphatic diamine.

7. The microporous membrane of claim 6 wherein a portion of the aliphatic groups are derived from an aliphatic amine-acid compound.

8. The microporous membrane of claim 7 wherein the aliphatic amine-acid compound is a lactam.

9. The microporous membrane of claim 8 wherein the lactam is selected from the group consisting of ε-caprolactam and ε-butyrolactam.

10. The microporous membrane of claim 6 wherein a portion of the aromatic groups are derived from an aromatic amine-acid compound.

11. The microporous membrane of claim 1 wherein the polyamide copolymer is prepared by reaction of an aromatic diamine and an aliphatic dicarboxylic acid.

12. The microporous membrane of claim 11 wherein a portion of the aliphatic groups are derived from an aliphatic amine-acid compound.

13. The microporous membrane of claim 12 wherein the aliphatic amine-acid compound is a lactam.

14. The microporous membrane of claim 13 wherein the lactam is selected from the group consisting of ε-caprolactam and ε-butyrolactam.

15. The microporous membrane of claim 11 wherein a portion of the aromatic groups are derived from an aromatic amine-acid compound.

16. The microporous membrane of claim 1 wherein the polyamide copolymer is prepared by a condensation polymerization reaction of ε-caprolactam, hexamethylene diamine, and phthalic acid.

17. The microporous membrane of claim 16 wherein the reactants for the condensation reaction are used in substantially equimolar proportions.

18. The microporous membrane of claim 1 wherein the polyamide copolymer is prepared by a condensation polymerization reaction of hexamethylene diamine and phthalic acid.

19. The microporous membrane of claim 1 wherein the pores have a bimodal pore structure in which smaller micropores having a diameter of about 0.04 to about 20 micrometers are on the surface and larger interconnecting pores that do not appear at the surface of the membrane are in the interior.

20. The microporous membrane of claim 1 which is skinless and wherein the pores which extend through the membrane from one surface to the other are substantially uniform.

21. The microporous membrane of claim 1 wherein the polyamide membrane contains methylene ($CH_2$) groups and amide (NHCO) groups and the ratio of methylene to amide groups $CH_2$:NHCO is less than about 4.

22. The microporous membrane of claim 1 wherein the membrane has a skin and there are smaller pores on at least one surface than in the interior of the membrane.

23. The microporous membrane of claim 1 wherein the aromatic group includes a hetero atom selected from nitrogen and oxygen.

24. The microporous membrane of claim 1 wherein the amide groups are substituted to form secondary amides.

25. The microporous membrane of claim 24 wherein the amide group substituent contains 2 to 4 carbon atoms.

26. The microporous membrane of claim 24 wherein the amide group substituent is selected from the group consisting of hydroxyl, methyl, alkoxymethyl wherein the alkoxy contains 1–4 carbon atoms, and methylol.

27. The microporous membrane of claim 24 wherein the amide group substituent is selected from the group consisting of ammonium, phosphonium, and ionium groups.

28. The microporous membrane of claim 1 which is hydrophobic.

29. The hydrophobic membrane of claim 28, wherein the copolymer has a methylene:amide ratio in the range of from about 2:1 to less than about 4:1.

30. The hydrophobic microporous membrane of claim 29, wherein the aromatic groups are unsubstituted benzene rings.

31. The microporous membrane of claim 29 wherein the aromatic groups contain at least one substituent selected from the group consisting of hydroxyl, alkyl ($C_{1-12}$), amine, aldehyde, nitrate, carboxyl, and halogen.

32. The microporous membrane of claim 1 which is hydrophilic.

33. The hydrophilic microporous membrane of claim 23 wherein the copolymer has a methylene:amide ratio in the range of from about 2:1 to less than about 4:1.

34. The hydrophilic microporous membrane of claim 33, wherein the aromatic groups are unsubstituted benzene rings.

35. The hydrophilic microporous membrane of claim 33, wherein the aromatic groups contain at least one substituent selected from the group consisting of hydroxyl, alkyl ($C_{1-12}$), amine, aldehyde, nitrate, carboxyl, and halogen.

36. A supported microporous membrane comprising the membrane of claim 1 cast onto a web.

37. The microporous membrane of claim 36 wherein said web is a nonwoven web selected from the group consisting of polyester, polypropylene, and polyethylene webs.

38. A process for preparing a microporous membrane having an absolute particle removal capability greater than 0.04 micrometers from an alcohol-insoluble polyamide resin having a methylene:amide ratio in the range of from about 2:1 to less than about 5:1 and containing aliphatic and aromatic groups which comprises the steps of dissolving the resin in a solvent and non-solvent mixture comprising hydrochloric acid, formic acid, and water to form a casting dope solution, casting the solution into a precipitation bath which is a nonsolvent for said resin to form the microporous membrane, and washing the membrane with water.

39. The process of claim 38, wherein the membrane is a hydrophilic microporous membrane and the copolymer has a methylene:amide ratio in the range of from about 2:1 to less than about 4:1.

40. The process of claim 38, wherein the membrane is a hydrophobic microporous membrane and the copolymer has a methylene:amide ratio in the range of from about 2:1 to less than about 4:1.

41. A process for the differential filtration of proteins from DNA, which comprises the step of filtering a composition containing DNA and proteins through the microporous membrane of claim 1.

\* \* \* \* \*

UNITED STATES PATENT AND TRADEMARK OFFICE
CERTIFICATE OF CORRECTION

PATENT NO. : 5,693,231
DATED : December 2, 1997
INVENTOR(S) : Johnson, et al

It is certified that error appears in the above-identified patent and that said Letters Patent is hereby corrected as shown below:

Column 14, line 24, Claim 33: Delete "23" and insert --32--.

Signed and Sealed this

Third Day of February, 1998

Attest:

BRUCE LEHMAN

Attesting Officer

Commissioner of Patents and Trademarks